Dec. 11, 1962
A. R. PERRINS
3,068,396
AUTOMATIC VOLTAGE REGULATOR
Filed March 18, 1957
2 Sheets-Sheet 1
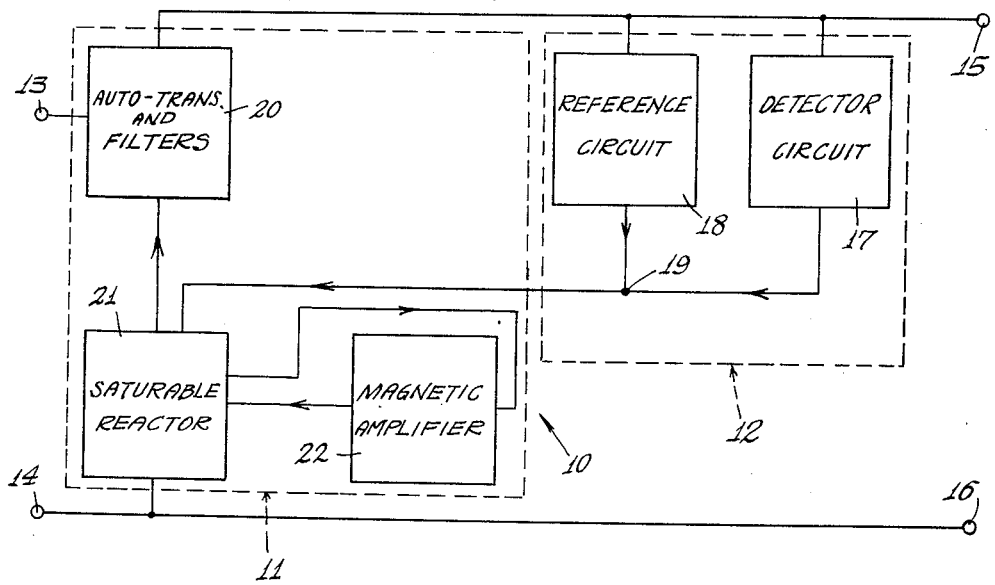
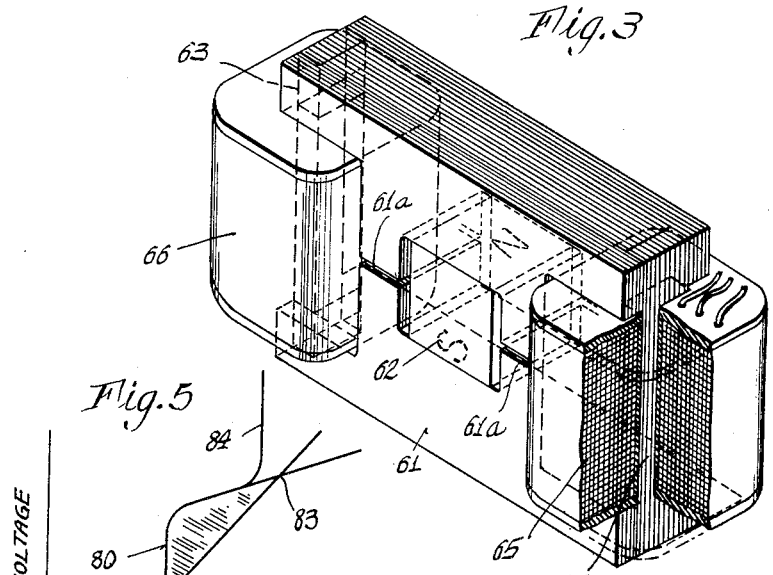
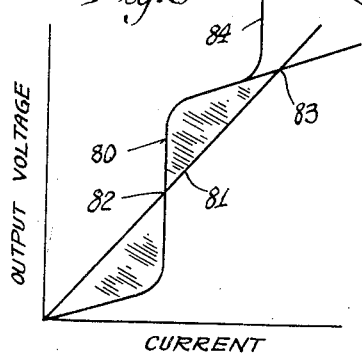
INVENTOR.
Allen R. Perrins
BY
Johnson and Kline
ATTORNEYS

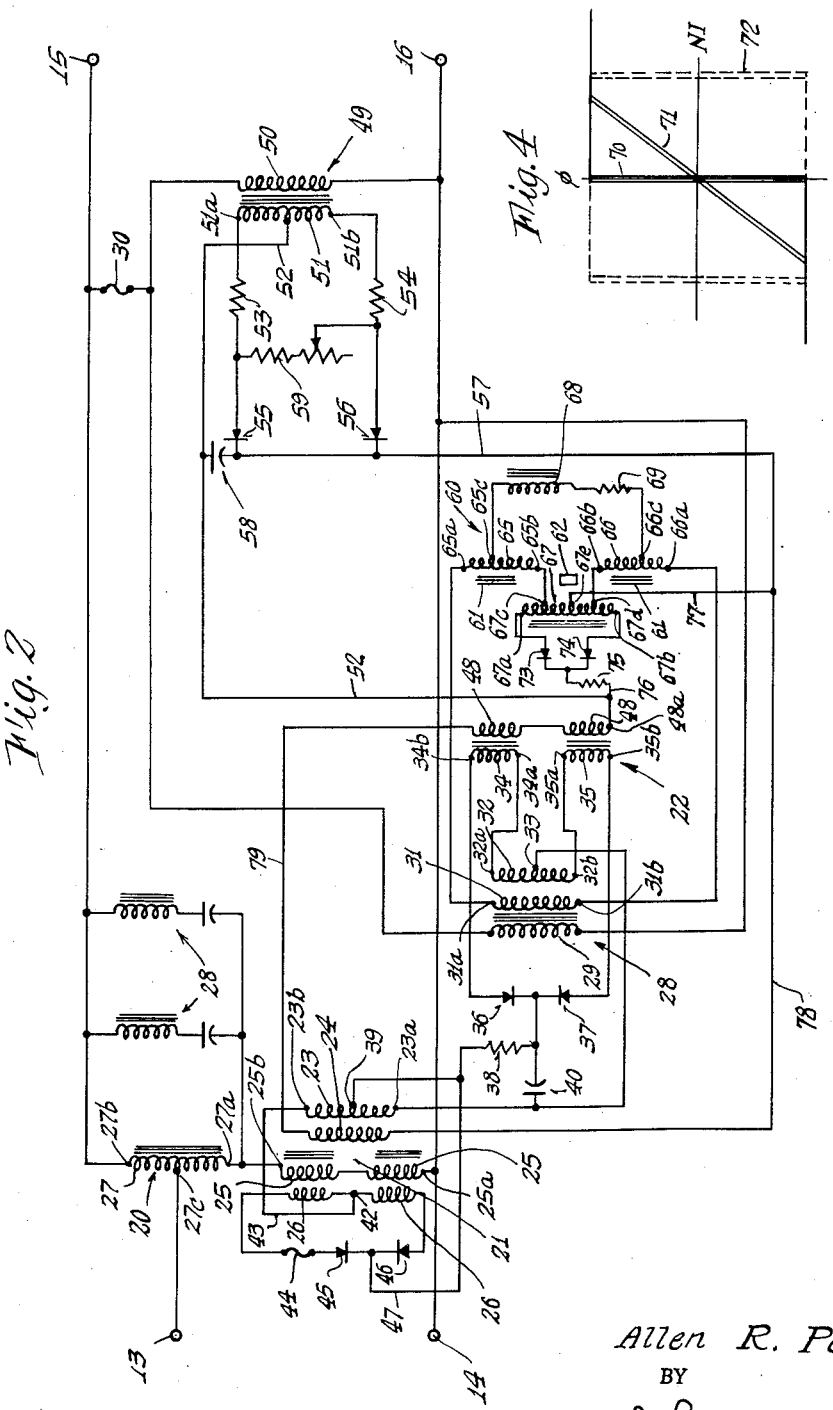

United States Patent Office 3,068,396
Patented Dec. 11, 1962

3,068,396
AUTOMATIC VOLTAGE REGULATOR
Allen R. Perrins, Cheshire, Conn., assignor to The Superior Electric Company, Bristol, Conn., a corporation of Connecticut
Filed Mar. 18, 1957, Ser. No. 646,996
9 Claims. (Cl. 323—66)

The present invention relates to an automatic A.C. voltage regulator for producing a substantially constant preselected A.C. output voltage for a range of input voltages and varying load conditions.

An automatic voltage regulator includes two units, one of which is generally termed the measuring unit and the other the regulating unit. The function of the measuring unit is to detect a change in the output voltage of the regulator and to produce a signal for control of the regulating unit. The regulating unit, upon receipt of the signal from the measuring unit, acts in a manner to correct the output voltage of the regulator to substantially the constant, preselected value. Heretofore, a measuring unit has included a plurality of electrical components but there has generally been one or two components which are more subject to error, malfunctioning and/or breakdown before other elements of the device. Thus, vibration, ambient temperature changes, and other extraneous conditions have caused the automatic voltage regulator to cease functioning and this cessation is generally traceable to these one or two components and the action thereon by the extraneous conditions. Such components include vacuum tubes, silicon diode references, tungsten filament lamps, and by reason of their not completely known characteristics, transistors. Moreover, certain components have a life expectancy limited by physical principles inherent in their basic structure. The vacuum tube and tungsten filament device have limited life due to evaporation of material from critical elements.

An object of the present invention is to provide an automatic voltage regulator which uses materials having a life expectancy not limited by such unavoidable physical phenomena.

It is a further object of the present invention to provide an automatic voltage regulator which is capable of withstanding the extraneous conditions without malfunctioning for a longer period than has heretofore been possible.

Another object of the present invention is to provide an automatic voltage regulator which is capable of functioning under extreme conditions of temperature, vibration, etc. and which, even under such conditions, has an extremely long troublefree life.

A further object of the present invention is to provide, in an automatic voltage regulator of the above type, for a measuring unit which does not include any of the above components which are more subject to error, malfunctioning or breakdown than the other components.

In attaining the above objects, the automatic voltage regulator of the present invention includes only components which individually are capable of withstanding extreme operating conditions. The majority of the basic elements in the regulator consists only of coils of wire on permeable cores, which are wound to be transformers, magnetic amplifiers, etc., whose characteristics for long life, even under adverse conditions, are well known.

The measuring unit, in the instant embodiment of the present invention, may be subdivided into two circuits, a detector circuit and a reference circuit. The detector circuit produces a signal which is indicative of the output voltage of the regulator while the reference circuit produces a signal which is substantially constant over a range of voltages, and the algebraic sum of the two signals is the output signal utilized to control the regulating unit.

A feature of the present invention resides in the reference circuit having an inductive reference source which is composed of a permeable core having a constant bias induced therein by a permanent magnet. Wound on the core are windings through which an alternating current is passed and by reason of the constant bias the amount of current through the windings is limited to a substantially steady value over a range of voltages. The current from the reference source is equal to the current from the detector circuit at two output voltages and hence there is a null point when the output voltage is at the desired value and a false null point at a higher output voltage. Since the regulator cannot distinguish between the null and false null, the reference circuit includes a saturable current transformer for eliminating the false null point.

Another feature of the present invention resides in providing a derivative feedback winding on the saturable reactor for stabilizing the response during correction of the output voltage. This is accomplished by providing feedback current in the magnetic amplifier of the regulating unit only when there is a change in the impedance of the saturable reactor.

Other features and advantages will hereinafter appear.

FIGURE 1 is a block diagram of the instant invention.

FIG. 2 is an electrical schematic diagram of the regulator.

FIG. 3 is a detailed view partly in section of the inductive reference source.

FIG. 4 is a graph showing the effective magnetic characteristic of the inductive reference source as a function of flux and ampere-turns.

FIG. 5 is a graph showing the relationship between the currents of the reference and detector circuits.

In the drawing, FIG. 1, the automatic voltage regulator of the present invention is generally indicated by the reference numeral 10 and includes a regulating unit 11 and a measuring unit 12. The regulator 10 has input terminals 13 and 14 which are connected to one side of the regulating unit 11 and output terminals 15 and 16 connected to the other side. The measuring unit 12 includes a detector circuit 17 and a reference circuit 18 which are joined as at 19 and the unit 12 produces the signal for controlling the regulating unit to maintain steady the value of the output voltage.

The regulating unit 11 as shown in FIG. 2 includes an autotransformer 20, a saturable reactor 21 and a magnetic amplifier 22. The saturable reactor 21 is provided with a control winding 23, a feedback winding 24, gate windings 25 and self-bias windings 26. The autotransformer 20 has the usual single winding 27 and the gate windings 25 of the saturable reactor are connected with the autotransformer winding 27 such that they, in effect, constitute a potential divider to increase or decrease the input voltage to the desired value of output voltage. To this end, one terminal 14 of the input is connected to an end 25a of the gate windings while the other end 25b is connected to an end 27a of the autotransformer winding 27. The output of the unit is from the end 25a of the gate windings and the other end 27b of the autotransformer winding. The other input terminal 13 is connected to an intermediate point as at 27c on the autotransformer winding.

Positioned across the autotransformer are filter circuits, generally indicated by the reference numeral 28, for reducing the harmonic content of the output voltage.

The magnetic amplifier 22 initially receives the signal from the measuring unit and amplifies it to control the impedance of the saturable reactor by passing current through the control winding 23 of the saturable reactor. To this end, there is provided a transformer 28 having a primary winding 29 connected across the output terminals through a fuse 30. The transformer includes two secondary windings 31 and 32 with the winding 32 being center tapped, as at 33.

The current from the winding 32 is utilized to provide an amplified signal for the saturable reactor and also self-saturation of the magnetic amplifier 22, so that the latter is polarized. The magnetic amplifier has two gate windings 34 and 35 and an end of each, 34a and 35a respectively, is connected to ends 32a and 32b of the winding 32. The other ends 34b and 35b of the gate windings are led through one-way valves 36 and 37 respectively and through a resistance 38 to a tap 39 on the control winding 23 of the saturable reactor. The center tap 33 of the winding 32 is connected to an end 23a of the control winding. Accordingly, the value of the current in the winding 32 is controlled by the impedance of the gate windings 34 and 35, is rectified by the one-way valves 36 and 37 and is fed through the control winding 23 to control the impedance of the saturable reactor 21. A condenser 40 is provided for filtering this amplified signal.

The self-bias windings 26 of the saturable reactor 21 are connected, as at 42, and this is connected by a lead 43 to an end 23b of the control winding 23. Connected in series with the self-bias windings 26 is a fuse 44 and a pair of opposed one-way valves 45 and 46. A lead 47 is interconnected between the opposed one-way valves 46 and 47 and the tap 39. The self-bias windings and their associated elements produce a unidirectional control current in the portion of the control winding 23 between the tap 39 and end 23b which provides for partial saturation of the reactor. The self-bias windings 26 are utilized to provide a biasing flux in the saturable reactor and, in addition, increase the accuracy of the regulator. This is accomplished by having the self-bias windings 26 decrease the range of control current required from the magnetic amplifier for varying the impedance of the saturable reactor between its maximum and minimum.

The windings 26 are wound on the cores to have a voltage drop thereacross which is equal to, or if desired may be made proportional to the voltage drop across the gate windings 25. The voltage drop is then rectified, by means of the one-way valves 45 and 46, to produce a unidirectional current which flows through the control winding 23 between the end 23b and the tap 39. This current opposes the control current from the magnetic amplifier. When the gate windings 25 have their highest impedance the voltage drop is large and since the self-bias windings 26 have the same voltage drop, there is more self-bias current flow in the portion of the winding 23 between the tap 39 and the end 23b. This condition of highest impedance occurs when the input voltage is at its highest value with no load on the regulator and a minimum amount of current from the magnetic amplifier is required while the self-bias windings produce their maximum control current. At a low input voltage, the control current is at a maximum while the voltage drop across the windings 25 is at a minimum and hence the self-bias windings 26 produce their minimum control current.

Normally, without the self-bias windings, the ratio between the maximum and minimum currents required from the magnetic amplifier over the range of the regulator would be approximately 15 to 1. By utilizing the self-bias windings the ratio is decreased to about 5 to 1. Since the self-bias control ampere turns are in opposition to the magnetic amplifier output control ampere turns, the value of the latter has to equal the sum of the self-bias control ampere turns plus the necessary control ampere turns for the saturable rector. The self-bias ampere turns have a maximum value when the necessary control ampere turns are the least and thus the minimum required magnetic amplifier current is substantially increased, for example four-fold. When the self-bias current is the least, the necessary control current is a maximum and thus the maximum value of magnetic amplifier current is only slightly increased. Thus the range between the maximum and minimum value of magnetic amplifier control current is substantially reduced. It will be apparent that decreasing the range of current enables increasing the accuracy of the regulator.

It will thus be appreciated that the impedance of the saturable reactor 21 is basically responsive to the amount of current passing through the gate windings 34 and 35 of the magnetic amplifier. This in turn is under the control of the value of current which flows in control windings 48 of the magnetic amplifier and this latter current includes the signal from the measuring unit.

The measuring unit, as stated, includes a detector circuit 17 and a reference circuit 18 with the signal being the algebraic sum of the output of the circuit. The detector circuit 17 is designed to produce an output which is indicative of the value of the output voltage. To this end there is included in the circuit, a transformer 49 having a primary winding 50 connected across the output terminals 15 and 16 of the regulator 10. A secondary winding 51 is center tapped by a lead 52 which constitutes one of the output leads of this circuit. The ends 51a and 51b of the winding 51 are connected through resistors 53 and 54 and one-way valves 55 and 56 respectively to a lead 57 which constitutes the other output lead of the circuit. Positioned across the leads 52 and 57 is a filtering condenser 58. Shunting the resistors 53 and 54 is an adjustable resistance 59 which is adjustable to control the ratio between the value of the output current of the detector circuit and the regulator output voltage.

The reference circuit 18 functions to produce inductively a constant current for a range of voltages against which the current from the detector circuit 18 is compared. To this end, the reference circuit includes an inductive reference source indicated generally by the reference numeral 60. This source includes a permeable core 61 and a permanent magnet 62 mounted in the core to provide a constant magnetomotive force in the core. The core 61 has the shape shown in FIG. 3 and includes two legs 63 and 64. In addition the core has air gaps 61a, for preventing demagnetization of the permanent magnet 62.

The source further includes two windings 65 and 66, with each winding encircling a leg. An end 31a of the winding 31 is connected to an end 65a of the winding 65 while the other end 31b is connected to an end 66a of the winding 66. The other ends 65b and 66b are connected to taps on a current transformer or more specifically an autotransformer 67, for reasons that will hereinafter appear. Each of the windings 65 and 66 has a tap, 65c and 66b, which are connected through an inductor 68 and a resistor 69.

Referring to FIG. 4 there is shown a graph depicting the characteristic of the inductive reference source. The ordinate of the graph is the flux of the core and the abscissa is the ampere turns produced by the windings on the core. If the core only had the windings 65 and 66 there would be produced a narrow vertical loop 70. The loop 70 indicates the characteristics of the source if there is no compensation by elements 68 and 69, no magnet 62 and without gaps 61a being present in the core. By adding the gaps 61a, a curve 71 which is a sloping narrow loop would be produced. The addition of the compensating elements 68 and 69 causes the loop to again be vertical by inducing a flux in the core which is out of phase with the initial flux. This amount of flux is controlled by the value of the resistor 69 and the phase relationship is determined by the value of inductor 68. The magnet 62 when added then shifts the loop to the curve shown in dotted lines and indicated by the reference numeral 72. The curve 72 is shown as ideally rectangular but because of the actual material from which the core is made, the shape thereof may be slightly altered. The curve 72 is the magnetic characteristic curve of the inductive reference source.

It will be appreciated that there is produced a constant value of ampere turns with a wide variation in the flux as shown by the straight vertical lines of the curve 72. Thus changes in flux when the inductive reference source is operating on the vertical lines will not vary the amperes produced by the source. In the operation of the source, the voltage impressed by the winding 31a on the source is equal to the sum of the voltage drop caused by the voltage producing a change in the flux in the core and the IR drop in the source. As the voltage across the source starts from zero and increases, there is initially a constant IR drop and no or substantially little drop due to change in flux in the core. Then at a point, the rate of change of flux assumes all the increase in voltage with the IR drop remaining constant and over this voltage range the source is operating on the vertical line of the curve 72. Then as the core becomes saturated any further increase in voltage is balanced by an increase in the IR drop. During the range where only the rate of change of flux absorbs the voltage the current in the output of the source remains substantially constant.

It will be appreciated that each winding 65 and 66 is in essence two windings, a gate winding and a compensating winding, the former being the whole length of each, while the latter is from the tap 65c to end 65b and tap 66c to end 66b. The utilization of one winding is a feature of the present invention.

As stated, the ends 65b and 66b are connected to taps (67c and 67d respectively) on the current autotransformer 67 while the ends 67a and 67b of the transformer 67 are connected through one-way valves 73 and 74 to a resistor 75. The latter in turn is connected by a lead 76 to an end 48a of the control winding 48 of the magnetic amplifier. The transformer 67 also has a center tap 67e which is connected by a lead 77 to the lead 57 of the detector circuit. Accordingly, the constant alternating current flowing in the windings 65 and 66 is rectified by the one-way valves 73 and 74 and appears as a constant D.C. current at the output leads 76 and 77.

In the operation of the regulator, assuming that the output voltage at the terminals 15 and 16 is the preselected voltage, the detector circuit produces a current which bears a ratio to the output voltage and may, for example in one embodiment of the invention, by 200 ma. The reference circuit also produces a current of 200 ma., which is constant over a sufficient range of voltages. However, with the values of the above currents there is no current from either the reference or the detector circuit flowing in the control windings 48 since the values of each oppose each other and their algebraic sum is zero. Thus the current of 200 ma. flows from the lead 57 to the tap 67e while a current of the same magnitude flows from the lead 76 to the lead 52. The control windings 48 of the magnetic amplifier accordingly may be considered as being across and connected to the outputs of both circuits with only the difference between the two currents flowing therethrough.

With no current flowing in the control windings 48, there is only flowing in the control winding 23 the normal bias current from the self-bias windings 26 and the normal current from the magnetic amplifier gate windings 34 and 35. The latter is designed to produce a given current with no current in the control windings 48, while a control current of one polarity will increase the output current of the magnetic amplifier and a control current of the reverse polarity will decrease it.

Assuming that the value of the output voltage increases above the selected desired value, then the detector circuit increases its current output. For example, with a 2 percent rise in output voltage, the current would increase to 204 ma. The reference circuit continues to produce a constant 200 ma. Accordingly, 200 ma. of the detector's circuit ouput is conducted through the lead 77 and only the 4 ma. is conducted through the control winding 48. This is accomplished in the instant embodiment through a lead 78, the feedback winding 24 and a lead 79, and through the control windings 48 to the other output lead 52 of the detector circuit. The 4 ma. signal increases the impedance of the magnetic amplifier to cause less current to flow to the control winding 23 of the saturable reactor which in turn increases the impedance of the reactor to adjust the output voltage to the desired level.

Assuming that the output voltage decreases below the desired level, then the output current of the detector circuit will be less than the output current of the reference circuit which will cause a current of the reverse polarity to flow through the control windings 48 of the magnetic amplifier, decreasing its impedance and increasing the current through the control winding 23 of the saturable reactor which will increase the output voltage of the regulator.

It will be appreciated that the current which flows from the measuring unit through the control windings 48 may be made sufficient to control the regulating unit. However, the inertia of the regulator to alter the output voltage has in certain instances created instability by the development of overshooting characteristics which causes oscillatory conditions and may be referred to as hunting. According to the present invention, the stability of the regulator has been increased to a satisfactory level by the feedback winding 24. The winding 24 is wound on the saturable reactor 21 so that there is no induced current therein when the impedance of the reactor remains constant and current is only induced when the impedance is changing and this current opposes the current flowing in the control windings 48 since the windings 24 and 48 are in series. This causes a decrease in the amount of control current in the control windings 48 prior to the output voltage being equal to the selected value so that overshooting of the output voltage is damped. It will be appreciated that the feedback current bears a relation to the rate of change of the current in the winding 23 and thus effects control of the magnetic amplifier only during transient conditions. By having the control winding 48 and the feedback winding 24 in series, only one control winding on the magnetic amplifier is required, thus obviating bulkiness and the necessity of larger values of control power.

Shown in FIG. 5 is a voltage-ampere diagram of the currents of the reference circuit and the detector circuit, being indicated by the reference numerals 80 and 81 respectively, plotted with the current on the abscissa and the output voltage of the regulator on the ordinate. At the point 82, which is a null point, the two currents are equal and there is no signal from the measuring unit or no current in the windings 48. Within the shaded area the regulator tends to be at the null point, which is the desired output voltage of the regulator. However, by reason of the characteristics of the inductive reference source, there is a false null point indicated at 83. The false null point 83 is not within the operating range of the regulator but in the event that the output voltage exceeds the false null point, the regulator would attempt to maintain the output voltage at the false null point value. To be illustrative, the null point 83 may have a value of 115 v. while the false null point may have a valve of 180 v. To obviate the false null point, the curve of the reference source is altered to that indicated by the reference numeral 84. It will be appreciated that the false null point is eliminated.

According to the present invention, the transformer 67 is of the saturating type which limits the output current to a maximum value irrespective of an increase in the input current beyond the maximum value. Thus as the output voltage of the regulator increases there is an increase in the value of current from the inductive reference source along the curve 80 to the false null point. However, prior to its value reaching the false null value, the input current surpasses the maximum value of the transformer 67 and the output current through the resistor 75 stays at approximately the maximum value, as indicated by the curve 84. The false null point is thus eliminated.

As stated, the adjustable resistor 59 is utilized to adjust the value constituting the preselected output voltage and functions in the circuit to vary the amount of current flowing in output lead 57 by controlling the amount of current being bled from the output leads. It will be appreciated that with the end 51a being positive, for example, and the lead 52 negative, that there are two paths for the current. One, constituting the output of the detector circuit, is through the resistor 53, one-way valve 55, lead 57 and back through lead 52. The other path, for bleeding current, is through the resistor 53, variable resistor 59 and resistor 54 to the end 51b of the winding 51. Thus by varying the value of the resistor 59, the value of the bleed current therethrough is varied to provide for adjusting the preselected output voltage.

It will be appreciated that there has been disclosed an A.C. voltage regulator in which only static elements are employed. The static elements consist of resistors, condensers, one-way valves and devices employing inductive characteristics such as transformer, saturable reactor, magnetic amplifiers and an inductive reference source. The inductive reference source, solely by means of magnetic flux produced by windings and a permanent magnet produces a substantially constant output current which is algebraically added to a current which is related to the output voltage. The difference, which indicates that the regulator output voltage is not at its preselected value, is then used to control the impedance of the saturable reactor for correcting the output voltage. Accordingly, the regulator of the present invention is capable of long troublefree usage, requiring a minimum of maintenance, and yet serves to satisfactorily control the output voltage for a wide range of input voltages.

Variations and modifications may be made within the scope of the claims and portions of the improvements may be used without others.

I claim:

1. An automatic voltage regulator for producing a substantially constant A.C. output voltage comprising an input connectable to a source of A.C.; an output; regulating means interposed between the input and output for adjusting the output voltage to a preselected value; a measuring unit having an output connected to the regulating means for controlling the regulating means, said measuring unit including a detector circuit for producing a current related to the value of the output voltage and a reference circuit for producing a current having a substantially constant value, with the output of the measuring unit being the algebraic sum of the currents.

2. The invention as defined in claim 1 in which the detector circuit includes output leads; input means connectable to the output of the regulator; rectifying means positioned between the input and output, and means for bleeding a variable portion of the input current from the output leads whereby the value of the output current of the detector circuit for a particular regulator output voltage may be varied to permit adjusting the desired regulator output voltage.

3. The invention as defined in claim 2 in which the means for bleeding includes an adjustable resistance to vary the amount of current bleed.

4. In an A.C. voltage regulator, a regulating unit for adjusting the input voltage to a preselected output voltage and a measuring unit for producing a signal to control the regulating unit, said regulating unit including a saturable reactor having a control, gate and feedback windings and a magnetic amplifier having a control winding which receives the signal from the measuring unit and gate windings connected to the saturable reactor control winding; said feedback winding being connected in series with the magnetic amplifier control winding and producing a current opposing the signal from the measuring unit only when the impedance of the saturable reactor is being changed whereby hunting of the regulator is obviated.

5. In an A.C. voltage regulator for producing a substantially constant preselected output voltage over a range of input voltages, a measuring unit comprising a detector circuit for producing a current which is related to the value of the output voltage, a reference source for producing a substantially constant output current for a range of output voltages with a variation in the output current above the range, connections connecting the detector circuit and the reference source so that their output currents are in opposition, the current from the detector circuit being equal to the current from the reference source at a null point within the range and a false null point above the range, and means in the connections for preventing the occurrence of the false null point.

6. The invention as defined in claim 5 in which the last-named means includes a saturating transformer having its input connected to the output of the reference source and which limits the maximum value of current at the output of the transformer.

7. In an A.C. voltage regulator, an inductive reference source for producing a substantially constant output current over a range of input voltages comprising a core of magnetic material having at least two legs, a winding on each leg, a tap intermediate each winding, impedance means interconnected between the taps for providing a reactive ampere turn bias which opposes and cancels the inductive ampere turns of the windings, and a permanent magnet for inducing a steady magnetic flux in the core.

8. In an A.C. voltage regulator a detector circuit for producing a current having a value related to the output voltage, a reference circuit for producing a current which is substantially constant for a range of output voltages, a magnetic amplifier having a control winding, and connections for passing through the control winding only the difference in current between the detector circuit current and the reference circuit current.

9. In an A.C. voltage regulator a detector circuit for producing a current having a value related to the output voltage, a reference circuit for producing a current which is substantially constant for a range of output voltages, a magnetic amplifier having a control winding, connections for passing through the control winding only the difference in current between the detector circuit current and the reference circuit current, in which the reference circuit includes an inductive reference source for producing a substantial constant A.C. current, a saturating transformer connected to the output of the reference source output, and rectifying means connected to the output of the transformer whereby the output of the reference circuit is a substantially constant unidirectional current having a maximum value.

References Cited in the file of this patent

UNITED STATES PATENTS

| | | |
|---|---|---|
| 1,284,293 | Fortescue | Nov. 12, 1918 |
| 2,078,880 | Logan | Apr. 27, 1937 |
| 2,179,299 | Murcek | Nov. 7, 1939 |
| 2,615,155 | Ogle | Oct. 21, 1952 |
| 2,629,853 | Harder et al. | Feb. 24, 1953 |
| 2,636,158 | Bedford | Apr. 21, 1953 |
| 2,721,303 | Silver | Oct. 18, 1955 |
| 2,740,936 | Anderson | Apr. 3, 1956 |
| 2,743,410 | Stearley | Apr. 24, 1956 |
| 2,751,549 | Chase | June 19, 1956 |
| 2,814,773 | Comins et al. | Nov. 26, 1957 |
| 2,825,866 | Morse | Mar. 4, 1958 |
| 2,854,620 | Steinitz | Sept. 30, 1958 |